US012381336B2

(12) United States Patent
Aguilar

(10) Patent No.: US 12,381,336 B2
(45) Date of Patent: Aug. 5, 2025

(54) WEDGE-SHAPED CLAMP

(71) Applicant: DB Research LLP, Harlingen, TX (US)

(72) Inventor: Daniel Aguilar, Mission, TX (US)

(73) Assignee: DB Research LLP, Harlingen, TX (US)

( * ) Notice: Subject to any disclaimer, the term of this patent is extended or adjusted under 35 U.S.C. 154(b) by 89 days.

(21) Appl. No.: 17/944,714

(22) Filed: Sep. 14, 2022

(65) Prior Publication Data

US 2024/0088577 A1 Mar. 14, 2024

(51) Int. Cl.
*H01R 4/46* (2006.01)
*H01R 43/04* (2006.01)

(52) U.S. Cl.
CPC ............... *H01R 4/46* (2013.01); *H01R 43/04* (2013.01)

(58) Field of Classification Search
CPC .................................. H01R 4/46; H01R 43/04
See application file for complete search history.

(56) References Cited

U.S. PATENT DOCUMENTS

2013/0309917 A1 11/2013 Tsai
2016/0172781 A1 6/2016 Nunner
2019/0115674 A1 4/2019 Lefavour

FOREIGN PATENT DOCUMENTS

| | | | | |
|---|---|---|---|---|
| CA | 2991472 A1 * | 7/2018 | | F16B 2/065 |
| CN | 109103614 A * | 12/2018 | | H01R 11/03 |
| CN | 106025979 A | 6/2020 | | |
| CN | 211858923 U * | 11/2020 | | |
| DE | 818658 | 10/1951 | | |
| DE | 102018126458 A1 | 6/2020 | | |
| FR | 2731556 A1 | 5/1997 | | |

OTHER PUBLICATIONS

International Search Report and Written Opinion of international application No. PCT/US23/74168, mailed Mar. 25, 2024, 11 pp.

* cited by examiner

*Primary Examiner* — Jean F Duverne
(74) *Attorney, Agent, or Firm* — Greenberg Traurig, LLP

(57) ABSTRACT

A wire clamping system includes a base and an insert. The base includes a first base wall; a second base wall; and a cavity defined by the first base wall and the second base wall. The cavity has a lower portion. The insert is configured to fit within the cavity, and includes a first end shaped to be substantially flush with the cavity; a second end opposite the first end; and at least two passages therethrough. At least two bolts are configured to be received by the second end of the insert and at least two holes positioned in the lower portion of the cavity. Securing the at least two bolts to the at least two holes in the cavity causes the first end of the insert to move towards the lower portion of the cavity.

20 Claims, 9 Drawing Sheets

WEDGE-SHAPED CLAMP

TECHNICAL FIELD

This disclosure generally relates to clamps for holding wires in place.

BACKGROUND

Wired connections require continuous contact between an exposed portion of a wire and an electrical contact. As such, it is important that once the wire is in position relative to the contact, the wire must be held or otherwise fixed in place.

DETAILED DESCRIPTION

Traditionally, when attaching a wire to a contact point, one of two methods is used. In a first, an exposed end of the wire is connected to a conductive ring, which is then slid onto a bolt like a nut. By virtue of its connection to the exposed end, the ring is an extension of the wire. Because this bolt may be the electrified contact point (or an extension of the electrified contact point), the connection of conductive ring to bolt provides an electrical connection. While the contact between the ring and bolt is generally strong due to the ring being relatively flush to the bolt, the connection between the exposed wire and the conductive ring may be weak or inconsistent without soldering to hold the wire to the ring. Soldering the connection is labor-intensive and requires an amount of precision.

In a second method, the exposed wire contacts the electrified bolt directly. Generally, this is accomplished by feeding the exposed wire into a channel, and then turning the bolt down from a top of the channel and onto the wire, such that the exposed wire is sandwiched between a wall of the channel and the electrified bolt. While this a quicker and easier connection that the soldering of the first method, the pressure of the bolt onto the wire often causes the wire to break or causes individual strands of the wire to spread out, which typically weakens the connection. As such, an improved clamping system for holding a wire in place is desired.

Figure 1:
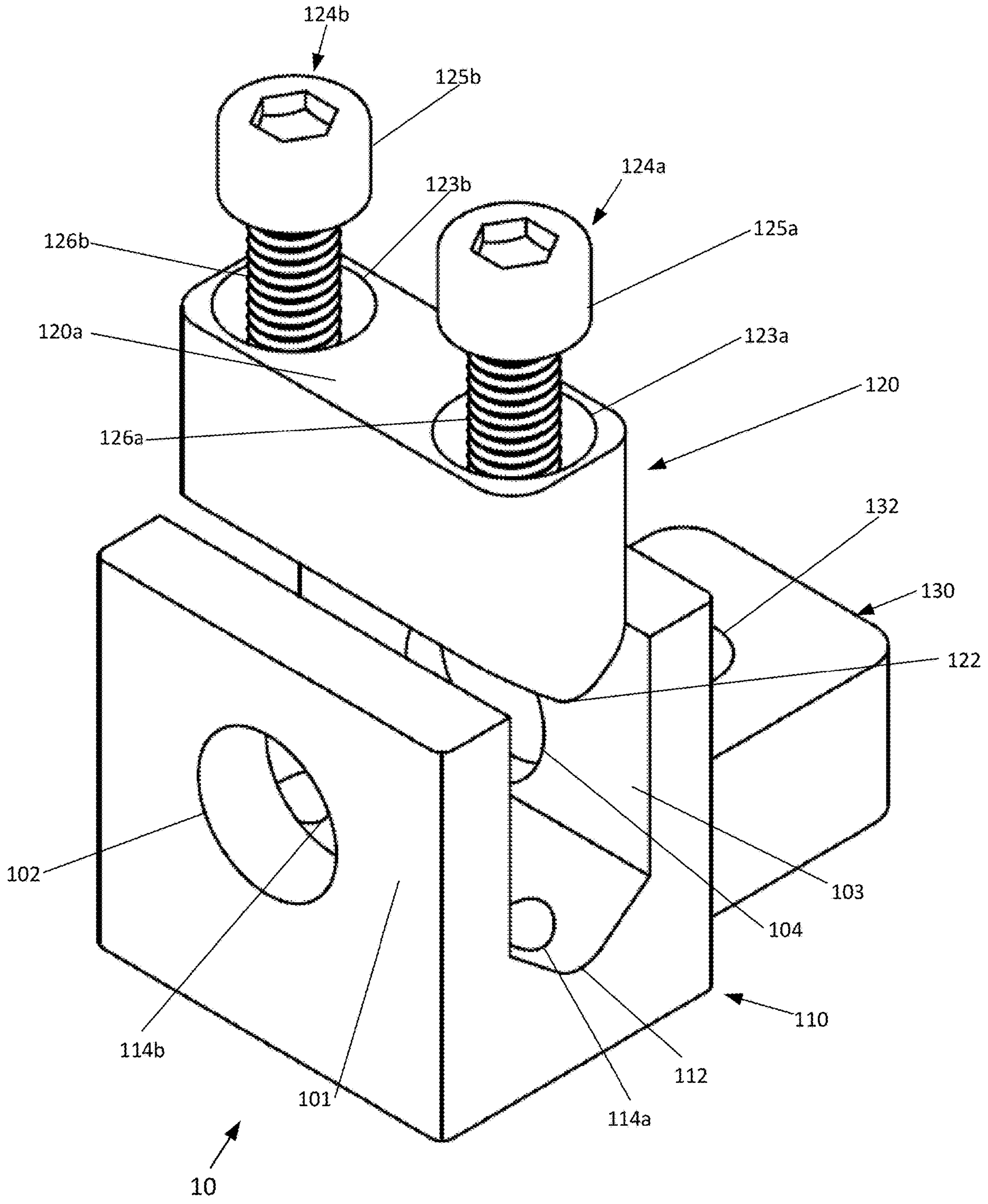
FIG. 1 is a perspective view of a system for clamping a wire in place.
Figure 2:
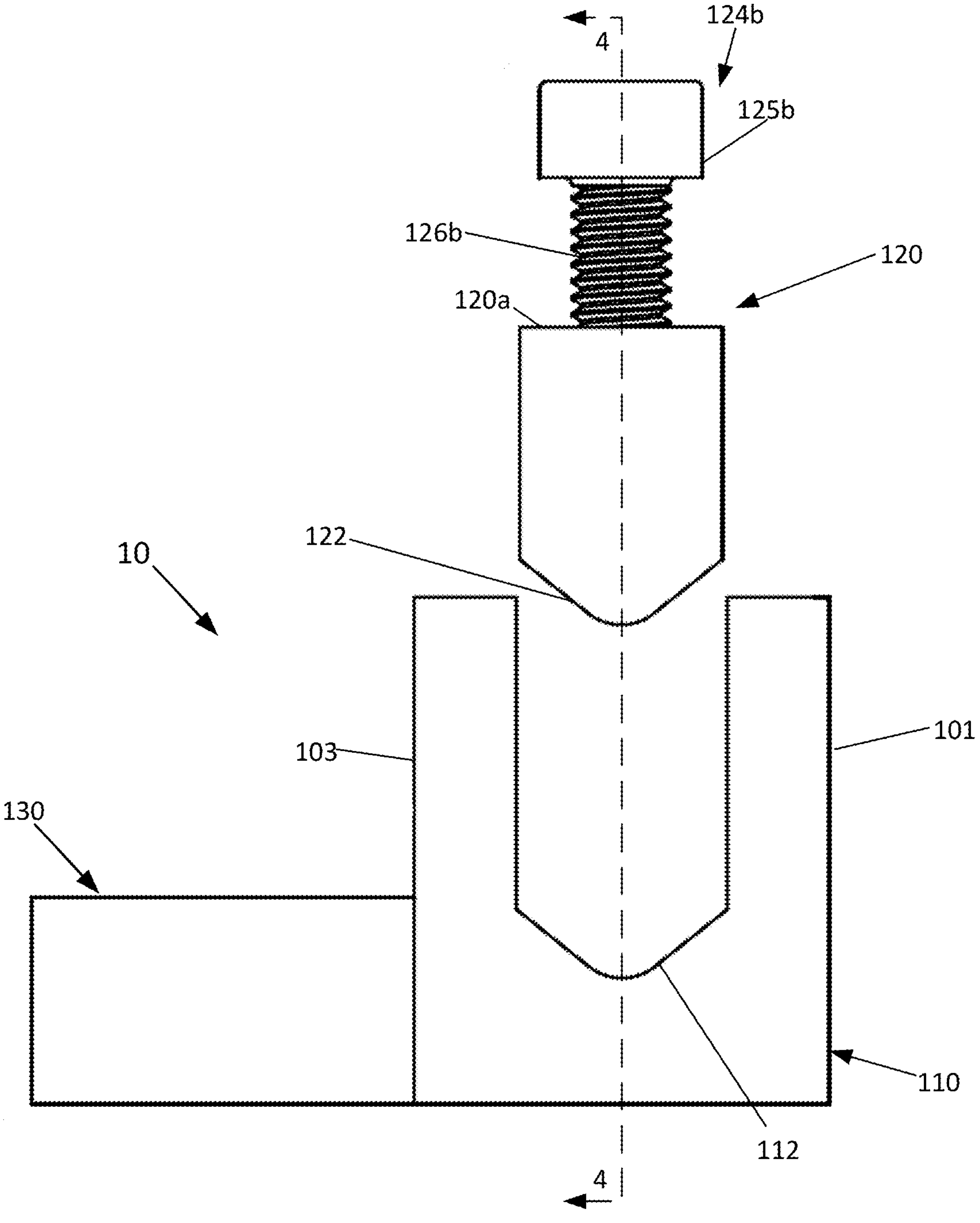
FIG. 2 is a side view of the system of FIG. 1.

Referring now to the drawings, wherein like numerals refer to the same or similar features in the various views, FIG. 1 is a perspective view of a system 10 for clamping a wire in place. As shown in FIGS. 1-5, the system 10 includes a base 110, an insert 120, and a contact 130. The base 110 may include a front wall 101 with a wire hole 102, a rear wall 103 with a wire stop 104, a cavity 112, and first and second bolt holes 114*a*, 114*b* (collectively "bolt holes 114"). The base 110 may be formed of any material that is heat-resistant and/or non-conducive to electricity, such as a plastic. The front wall 101 and the rear wall 103 may be substantially parallel, and a size of a gap between the front wall 101 and the rear wall 103 may be based on a gauge of a wire being inserted, on a preferred size of contact point (e.g., wire contact 116 shown in FIG. 3), or any other preferred dimension that permits sufficient contact with the wire being inserted allowing adequate conductivity.

The wire hole 102 may be positioned on the front wall 101 of the base 110, and may pass entirely through the front wall 101. The wire hole 102 may be shaped and sized to receive relatively large-gauge wires for electronics or speaker applications, such that the wire hole 102 may be 10 mm in diameter (although larger or smaller diameter holes are intended to be within the scope of this disclosure). Furthermore, although the wire hole 102 is shown as a circular hole, the wire hole 102 may be any shape (e.g., square, oval, etc.) capable of receiving a wire and permitting passage of the wire through the hole. The wire hole 102 may be formed in the base 110 via a drill press or similar tool using an appropriately-sized bit, or may be formed during an initial mold of the base 110 (such that the base 110 is molded with the wire hole 102 already in position).

The wire stop 104 may be an indent or slot in the rear wall 103 of the base 110. The wire stop 104 may be sized and shaped similarly to the wire hole 102, such that the wire hole 102 and wire stop 104 may be machined by the same bit in the same press. In contrast to the wire hole 102, the wire stop 104 may not pass through the rear wall 103 of the base 110, such that the wire stop 104 includes a portion of the rear wall 103 as a stop or end point to impede further insertion of the wire. The wire stop 104 may be used as a guide for an amount of exposed wire to be inserted into the base 110. As discussed in depth below with regard to FIGS. 6-7, the insert 120 may press a wire into the cavity 112, which causes the wire to at least partially conform to the shape of the insert 120 and cavity 112. Because this conformed shape may cause the wire to have a shorter horizontal distance as compared to an inserted length of the un-pressed wire, the inserted length of the un-pressed wire may be greater than a distance between the front wall 101 and the rear wall 103 so that the wire, when the wire is in its conformed shape, may extend from the front wall 101 to the rear wall 103. The greater inserted length may be achieved by the wire stop 104, which enables the amount of inserted wire to be greater than the gap between the front wall 101 and rear wall 103. To this end, the depth of the wire stop 104 (e.g., the amount of material of the rear wall 103 machined away to form the wire stop 104) may be the additional length required to enable the conformed wire to be sufficiently long following the pressing by the insert 120. In some embodiments, the wire stop 104 may be omitted, such that the rear wall 103 alone may act as an end point (or wire stop) for an inserted wire.

The gap between the front wall 101 and rear wall 103 may include the cavity 112, such that endpoints for the cavity 112 may be defined by the front wall 101 on a front side and by the rear wall 103 on a rear side. The cavity 112 may be substantially parabolic from a side view (e.g., the view of FIG. 2), such that a nadir of the cavity 112 may be a curved portion of material and may be below (e.g., relative to the orientation shown in FIG. 1) the points at which the cavity 112 intersects with the front wall 101 and the rear wall 103. The cavity 112 is described in greater depth with reference to FIG. 5 below.

Figure 3:
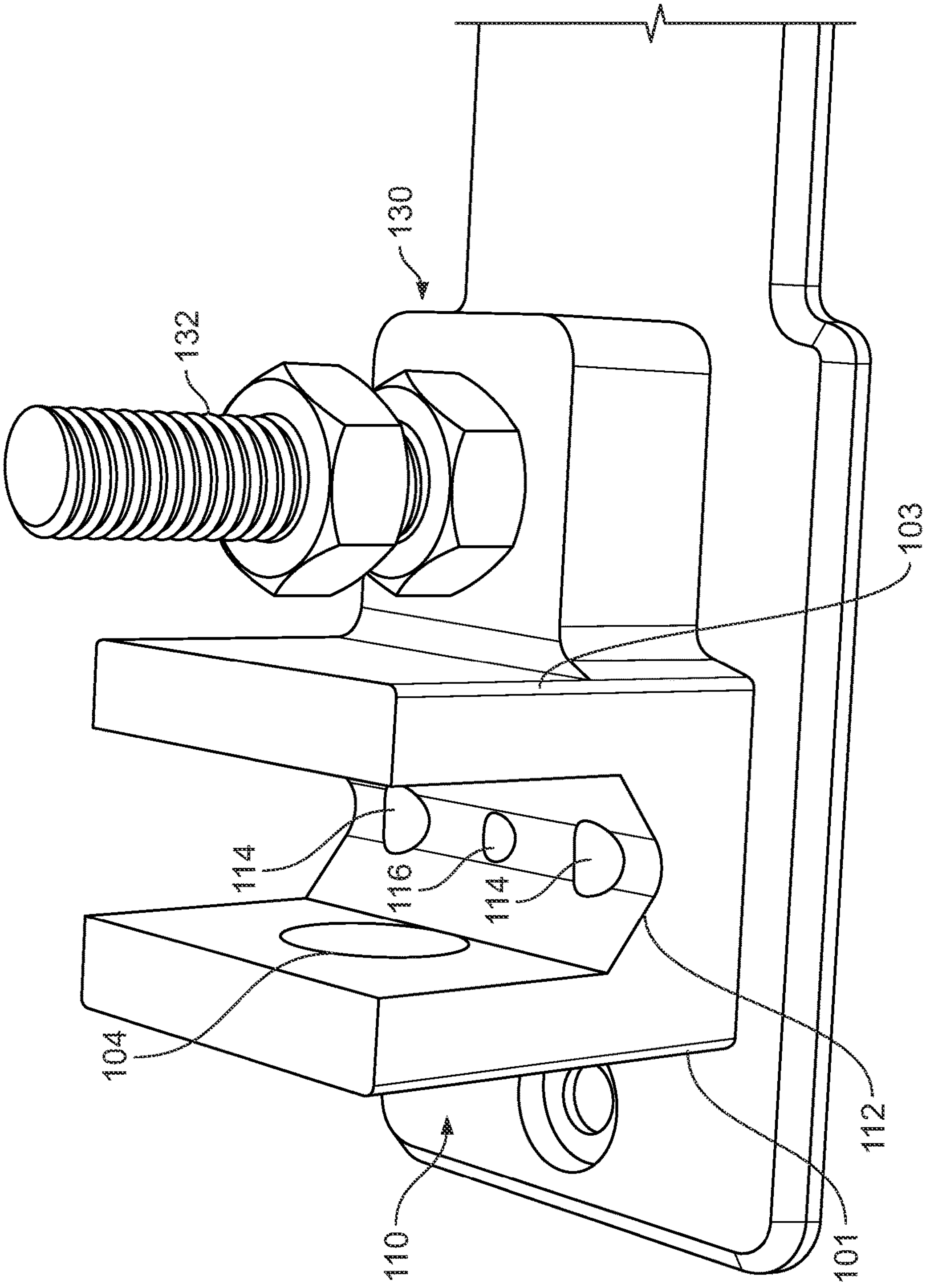
FIG. 3 is a perspective view of the system of FIG. 1.

As shown in FIG. 3, the bolt holes 114 may be in the base 110 and may be positioned in and/or adjacent to a bottom (e.g., relative to the orientation of FIG. 1) of the cavity 112, and may be sized and shaped to receive first and second bolts 124*a*, 124*b* (collectively "bolts 124"). Although the bolts 124 are shown and described as bolts, the bolts 124 may be any similar fastener. As such, the bolt holes 114 may have a diameter substantially equal to a diameter of threaded portions 126*a*, 126*b* (collectively "threaded portions 126") of the bolts 124. In those embodiments in which the bolts 124 have different diameters, the bolt holes 114 may have similarly corresponding different diameters. The bolt holes 114 may also be threaded, such that the bolt holes 114 may engage with corresponding threads on the bolts 124 to cause the bolts 124 to move longitudinally (relative to the bolt holes 114) when the bolts 124 are rotated (e.g., turned, screwed, secured, etc.). The bolt holes 114 may be positioned on either side of wire contact 116 to correspond with the bolts 124 being positioned on either side of wire contact 116, as described below in greater detail with regard to FIGS. 6-7. Although two bolt holes 114 are shown, a greater or fewer number of bolt holes 114 may be included, based on the number of bolts 124. For example, if only a single bolt 124 is utilized, there may be only a single bolt hole 114 in the base 110. In another example, if four bolts 124 are utilized, there may be four corresponding bolt holes 114 in the base. In this example, due to the number of bolts 124 and bolt holes 114, the size of each may be smaller to accommodate the increased number.

The insert 120 may include a wire surface 122 and first and second bolt passages 123*a*, 123*b* (collectively "bolt passages 123") that correspond to the bolts 124. The wire surface 122 may be substantially parabolic from a side view, such that a lowest point (relative to the view of FIG. 1) is in a center of the insert 120, and the wire surface 122 slopes upwards toward the sides of the insert 120 from the center point. As such, the insert 120 may be substantially wedge-shaped. The wire surface 122 may have the same slope and substantially the same shape as the cavity 112, such that the wire surface 122 may be flush with the cavity 112 when engaged with the cavity 112 without the presence of any wire. As described in greater detail below, the fact that the wire surface 122 matches the shape of the cavity 112 may be important for distributing the compressing force across a compressed wire to reduce the risk of fraying.

The bolts 124 may each include bolt caps 125*a*, 125*b* (collectively "bolt caps 125") and threaded portions 126. The bolt caps 125 may have a larger diameter than the threaded portions 126, and may be configured to fit with a tool for rotation or turning the bolts 124. Although the bolt caps 125 are shown as substantially circular and configured for use with a hex-key, any shape (e.g., square, triangular, octagonal, etc.) and configuration for any tool (e.g., screw-driver, Allen wrench, etc.) may be considered within the scope of this disclosure. Additionally, although the bolt caps 125 are shown to include a recess for receiving a hex-key, the bolt caps 125 may alternatively include a protrusion for interaction with a tool (e.g., wrench). As described above, the threaded portions 126 may be threaded to interface with the bolt holes 114 of the base 110. In some embodiments, each of threaded portions 126*a*, 126*b* may have a same diameter, such that bolts 124*a*, 124*b* may be substantially the same bolt. In other embodiments, each of threaded portions 126*a*, 126*b* may have a different diameter, such that bolts 124*a*, 124*b* may be substantially different bolts. Similarly, each of bolt caps 125*a*, 125*b* may be substantially the same (e.g., the same size, be configured for the same tool), or may be substantially different.

Figure 4:
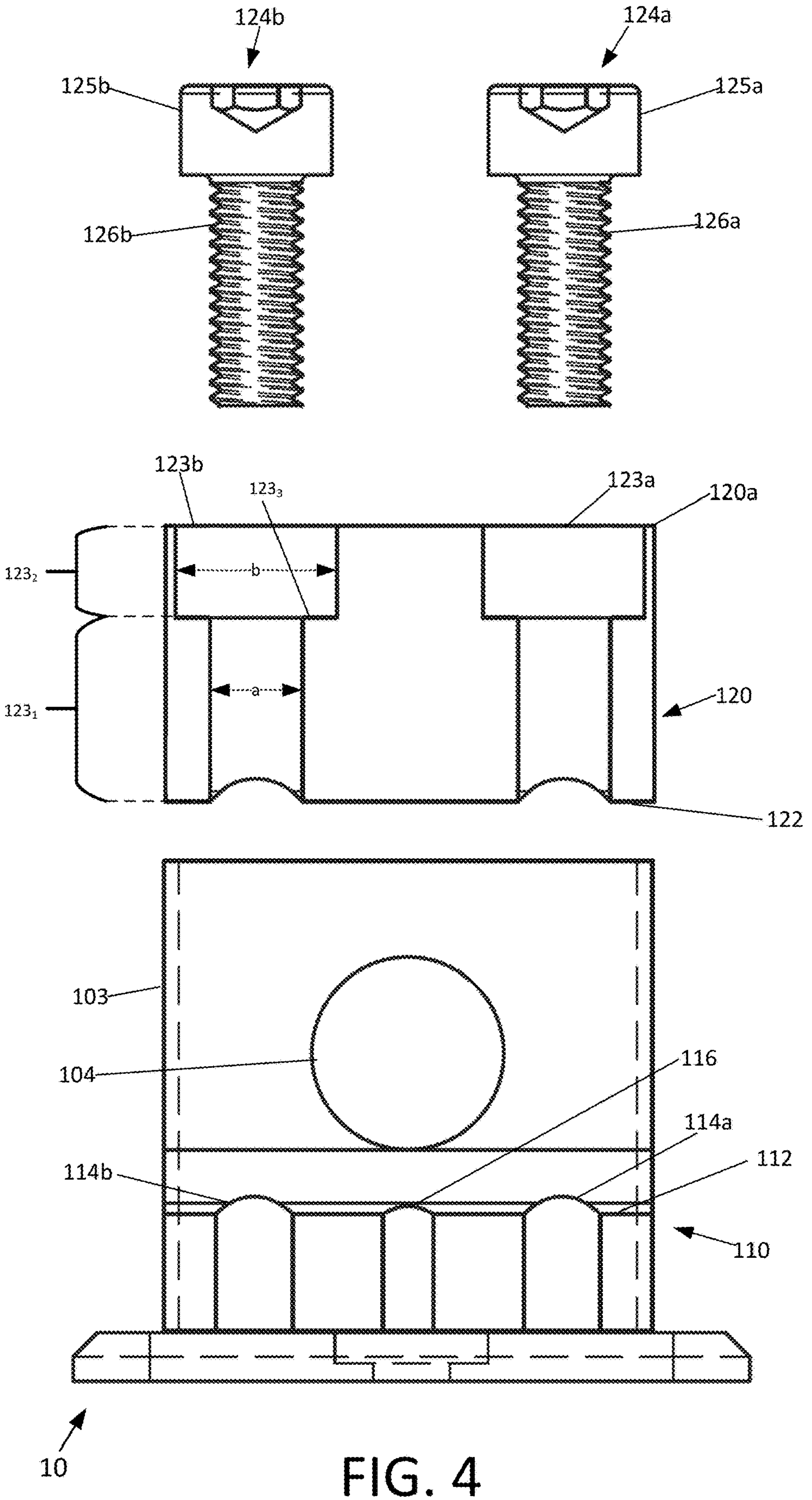
FIG. 4 is a section view of the system of FIG. 1 taken along line 4-4 in FIG. 2.
Figure 5:
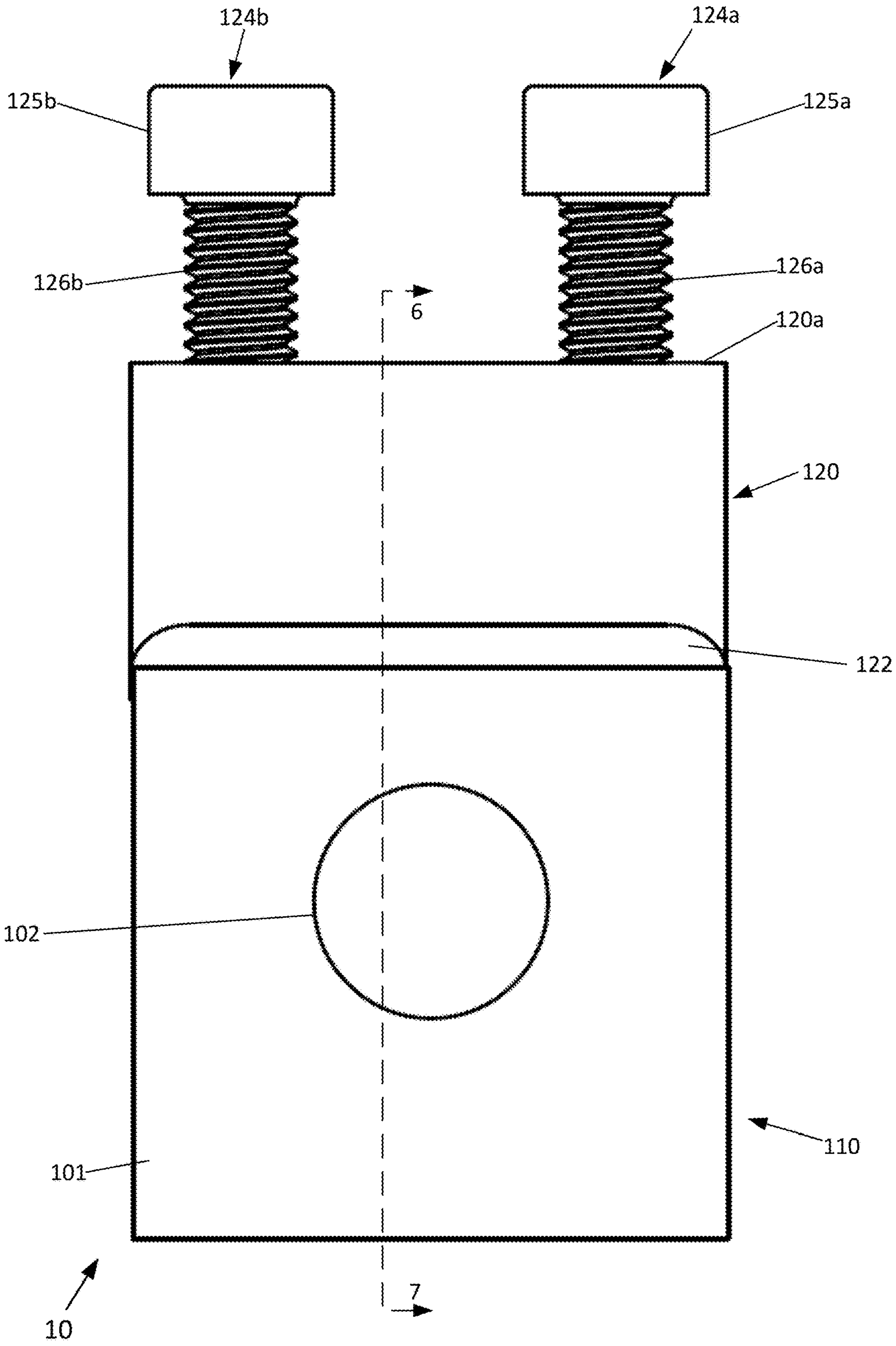
FIG. 5 is a front view of the system of FIG. 1.

The bolt passages 123 may be substantially smooth, such that the bolts 124 are able to rotate freely within the bolt passages 123. In some embodiments, the bolt passages 123 have a diameter substantially equal to the diameter of the threaded portions of the bolts 124, such that the threaded portions of the bolts 124 may be positioned within the bolt passages 123 but the bolt caps 125 may be too large. In these embodiments, the bolt caps 125 may interface with a top surface 120*a* of the insert 120. As shown in FIG. 4, which is a section view taken along line 4-4 of FIG. 2, in other embodiments, the bolt passages 123 may have a first portion $\mathbf{123}_1$ with a first diameter (shown as 'a' in FIG. 4) substantially equal to the diameter of the threaded portions of the bolts 124 and a second portion $\mathbf{123}_2$ with a second diameter (shown as 'b' in FIG. 4) substantially equal to the diameter of the bolt caps 125. The first portion $\mathbf{123}_1$ may be positioned longitudinally below the second portion $\mathbf{123}_2$ (relative to the view of FIG. 4), such that the narrower first portion $\mathbf{123}_1$ is closer to the wire surface 122 and the wider second portion $\mathbf{123}_2$ is closer to the top surface 120*a*. In these embodiments, the entire bolts 124 may be positioned within the bolt passages 123, with the threaded portions 126 able to pass through the entire bolt passages 123, while the bolt caps 125 may be able to pass through only the second portion $\mathbf{123}_2$. As such, the bolt caps 125 may interface with a lip $\mathbf{123}_3$ formed by the transition from the wider second portion $\mathbf{123}_2$ to the narrower first portion $\mathbf{123}_1$. In some embodiments, the first and second diameters and/or a length of the first and second portions $\mathbf{123}_1$, $\mathbf{123}_2$ of bolt passages 123*a*, 123*b* may be the same, such that the bolt passages 123 may be configured to receive identical bolts 124. In other embodiments, the first and second diameters of bolt passages 123*a*, 123*b* and/or a length of the first and second portions $\mathbf{123}_1$, $\mathbf{123}_2$ may be different, such that the bolt passages 123 may be configured to receive different bolts 124.

In either embodiment, the interaction with the bolt caps 125 and a corresponding surface (e.g., top surface 120*a* or lip $\mathbf{123}_3$ within bolt passages 123) works in conjunction with the bolt holes 114 to cause the bolts 124 to draw the insert 120 into cavity 112 towards base 110. In particular, as the bolts 124 may be secured or turned into the base 110 via the bolt holes 114, the bolts 124 may move longitudinally into the base 110. As the bolts 124 move into the base 110, a distance between the bolt caps 125 and the base 110 may decrease due to the bolts 124 becoming functionally shorter. Because the bolt caps 125 may be interfacing with the insert 120, as described above, the bolt caps 125 may restrict the upward (relative to the view of FIG. 1) movement of the insert 120, while the downward (relative to the view of FIG. 1) movement of the insert 120 may be restricted by the base 110 (and more specifically, the cavity 112). Accordingly, as the distance between the bolt caps 125 and the base 110 decreases, the range of motion for the insert 120 decreases until the insert 120 may be snug or flush with the top of cavity 112. By turning one or more of bolts 124, therefore, the insert 120 may be compelled toward the base 110 in order to, for example, compress a wire within cavity 112 that was inserted into wire hole 102.

The contact 130 may extend laterally from the base 110 and may include an external contact 132. The external contact 132 may be an exposed or partially-exposed electrified surface that may be in connection with the inserted wire via the wire contact 116 (shown in FIG. 3). Each of the wire contact 116 and the external contact 132 may be formed of a conductive material (e.g., zinc, copper, aluminum, etc.). The external contact 132 may further be configured to receive an electrified contact from a separate wire or connector, such that the contact 130 as a whole helps to facilitate an electrical connection between a wire clamped in the system 10 and this separate wire. For example, the external contact 132 may be configured to mate and/or interact with a fuse holder, such as fuse holder 150 of FIG. 8. The contact 130 and the base 110 may be monolithic, such that an electrical current that is received by the base 110 (e.g., from the inserted wire via the wire contact 116) may be carried to the contact 130 (e.g., to the external contact 132).

Figure 6:
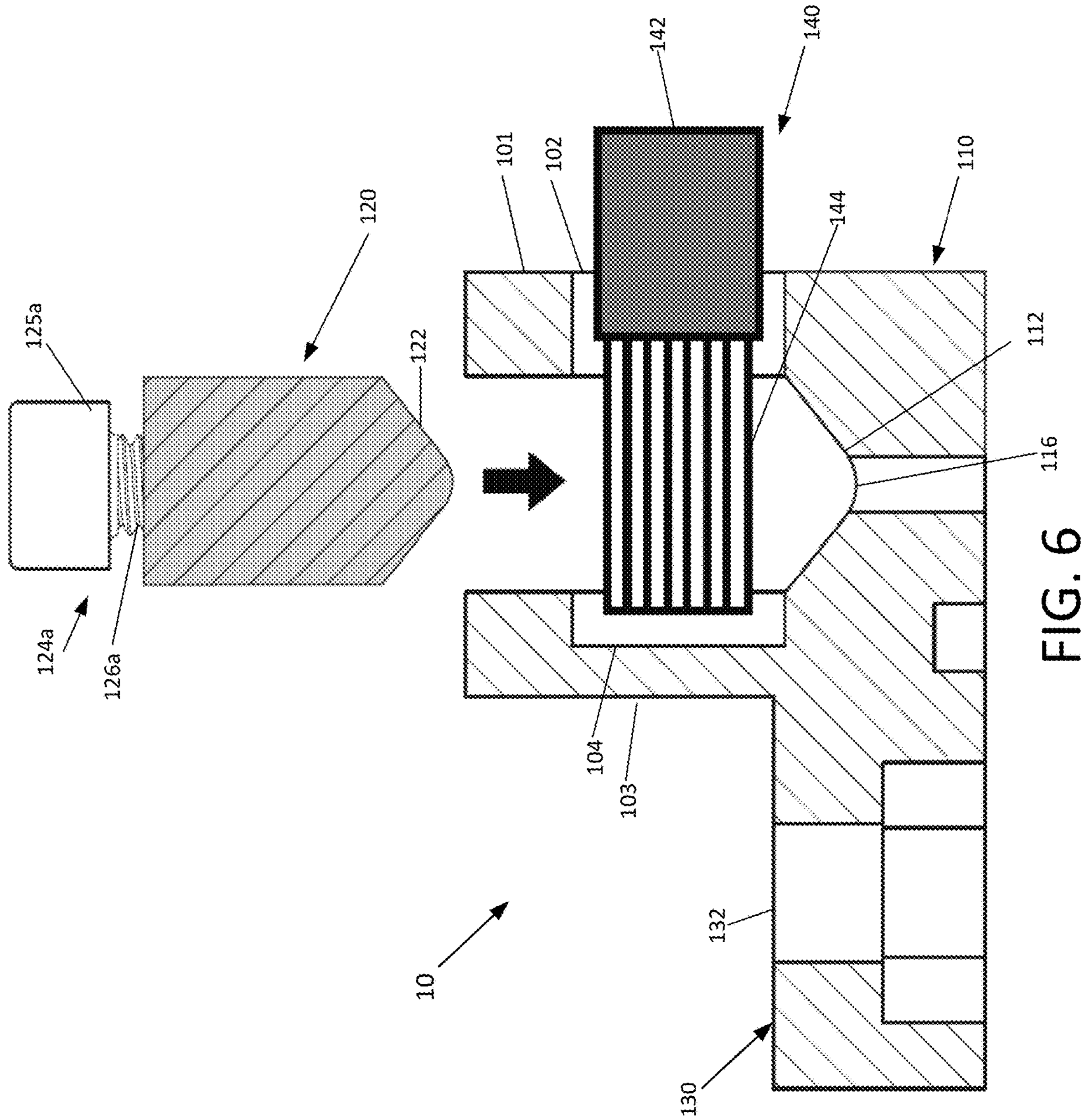
FIG. 6 is a section view of the system of FIG. 1 taken along line 6-6 in FIG. 5.
Figure 7:
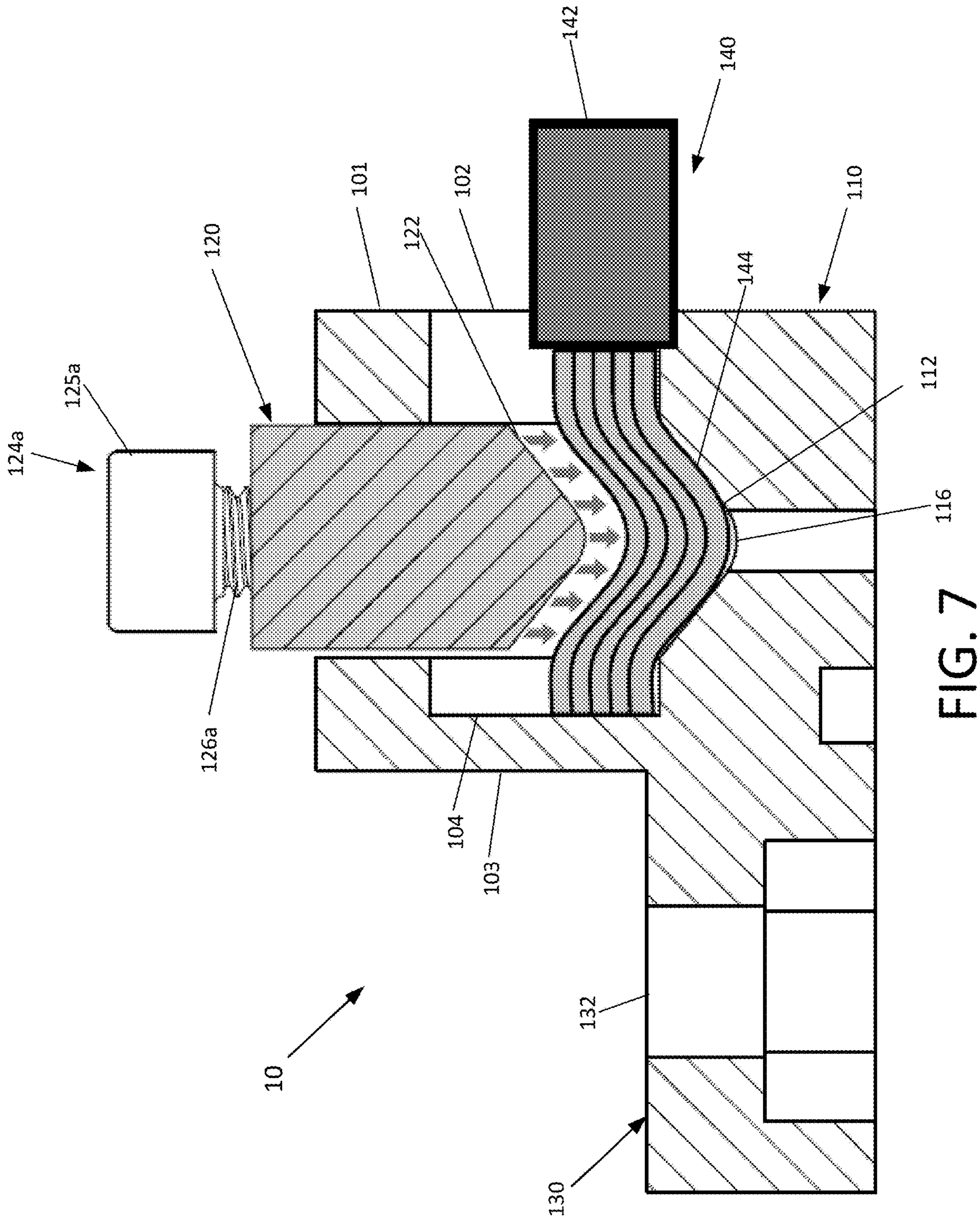
FIG. 7 is a section view of the system of FIG. 1 taken along line 6-6 in FIG. 5.

FIGS. 6-7 are section views of the system 10 taken along line 6-6 in FIG. 4. FIG. 6 demonstrates the system 10 in a disengaged state, and FIG. 7 demonstrates the system 10 in an engaged state. As shown, the system 10 may further include wire 140, which may be inserted into wire hole 102, as discussed above. The wire 140 may be any suitable strand of metal that can conduct an electrical signal, such as aluminum, copper, nickel, or steel. The wire 140 may be formed of a single strand (e.g., "solid wire") or of multiple strands (e.g., "stranded wire") that are bundled or wrapped together, possibly with a layer of insulation. The electrical signal that passes through the wire may be indicative of an audio or video signal, such that the wire 140 may be used to pass an audio or video signal from an input source to an output source. The wire 140 may include an insulated portion 142 and an exposed portion 144. The insulated portion 142 may include a layer of insulation (e.g., plastic, rubber-like polymer, etc.) positioned around the inner strands or fibers of the wire 140. The exposed portion 144 may be an amount of the wire 140 that was stripped of insulation, such the inner strands or fibers of the wire 140 may be exposed (e.g., the electrical current running through the wire may flow into or through any conductive surface that the exposed portion 144 touches or contacts).

The wire 140 may be inserted into the wire hole 102. The wire 140 may be inserted for a desired amount, which may be based on an end of the exposed portion 144 abutting the wire stop 104. By then turning or securing at least one of the bolts 124 into the bolt holes 114, the insert 120 may be drawn, as indicated by the single arrow of FIG. 6, into the exposed portion 144 to compress the exposed portion 144 into the cavity 112 generally and onto the wire contact 116 particularly. As demonstrated by the arrows extending from the wire surface 122 in FIG. 7, the shape of the wire surface 122 may cause the insert 120 to apply pressure across the entire length of the wire surface 122 to distribute the compression applied to the wire 140 across a greater length of the wire 140. By distributing the compression in this manner, the system 10 provides at least two distinct benefits. First, because the insert 120 has a greater amount of surface area in contact with the wire 140, in contrast to traditional methods that use a single bolt to hold a wire in place, the system 10 provides a more secure and stable hold due in large part to the increase in stiction from the increased surface area. Second, by dispersing the force across the wire 140 rather than concentrating the force at a single point (e.g., as with a traditional single bolt), the system 10 reduces the risk of fraying, which not only reduces damage to the wire 140 and improves the stability of the connection. Particularly if the wire 140 is a stranded wire, each strand of the wire 140 may carry an equal amount of electrical current, so if the wire 140 is frayed or otherwise damaged, one or more strands may be extending (e.g., jutting) away from the wire contact 116 and any current carried by those strands may be ineffective to maintain electrical contact.

Figure 8:
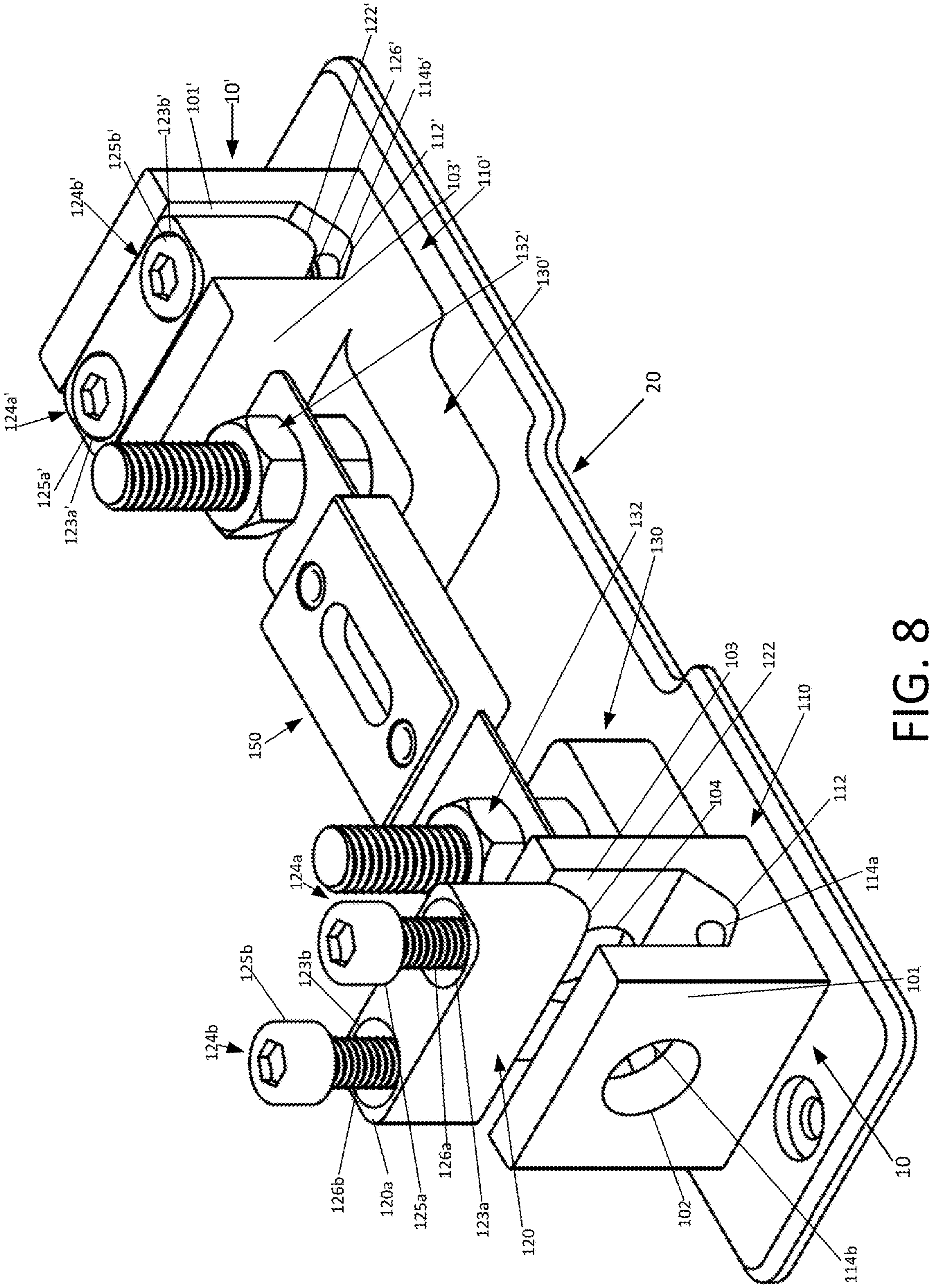
FIG. 8 is a perspective view of an example implementation of the system of FIG. 1.

FIG. 8 is a perspective view of an example implementation of the system 10. In this example implementation, a first system 10 and a second system 10' may be mounted onto a board 20. The board 20 may be formed of a non-conductive material, such that the board may not interfere or impede any electrical current flowing through either system 10, 10'. The first system 10 and second system 10' may be identical, and may be oriented to mirror each other, such that contacts 130, 130' may be proximate. As shown, the first system 10 shows the system 10 in a disengaged state, with the insert 120 elevated and separated from the base 110 in preparation of receiving a wire (e.g., wire 140). The second system 10' shows the system 10 in an engaged state, with the insert 120' secured down into the base 110' to compress a wire if one was present. A fuse holder 150 may be positioned between the systems 10, 10', with a first end of the fuse holder 150 operatively coupled to the first system 10 and a second end of the fuse holder 150 operatively coupled to the second system 10'. The fuse holder 150 may be any suitable fuse holder that may be capable of providing fuse protection across a wired electrical connection, such as the one formed by a first wire clamped by first system 10 and a second wire clamped by second system 10'.

Figure 9:
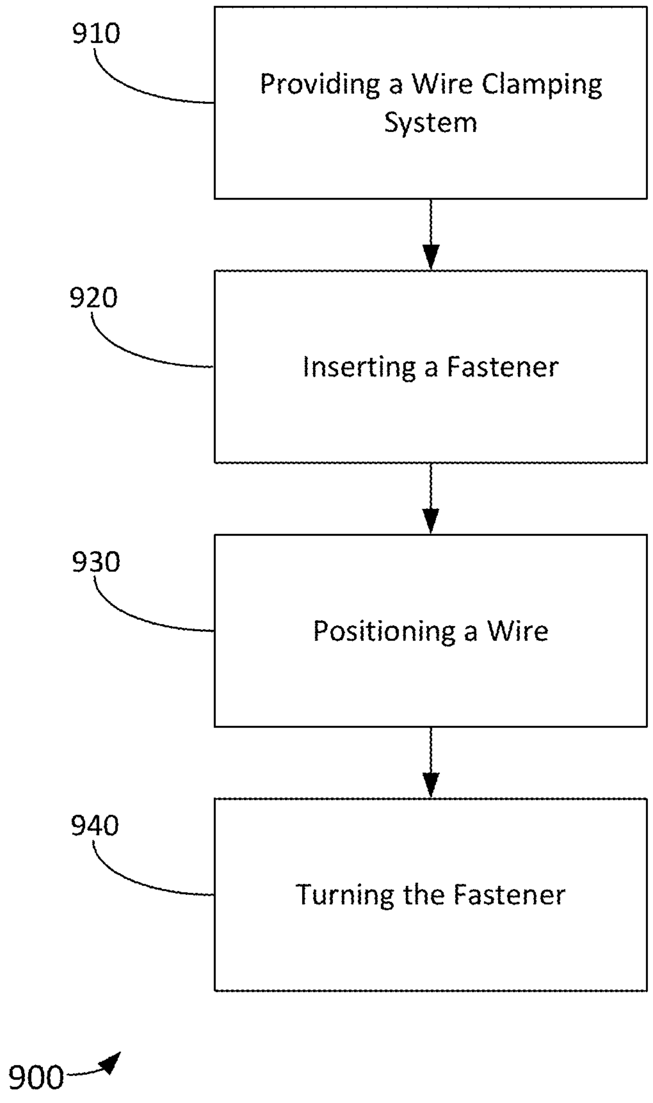
FIG. 9 is a flow chart illustrating an example method of clamping a wire in place using the system of FIG. 1.

FIG. 9 is a flow chart illustrating an example method 900 of clamping a wire in place using the system 10, for example. The method 900 may include, at block 910, providing a wire clamping system. The wire clamping system provided may be the system 10, and may include a base (e.g., base 110) and an insert (e.g., insert 120). The base may include a first base wall (e.g., first wall 101) with an opening (e.g., wire hole 102), a second base wall (e.g., second wall 103), and a cavity (e.g., cavity 112) that is defined on either side by the first and second base walls. The cavity may include at least two holes (e.g., bolt holes 114), as well as an internal contact (e.g., wire contact 116). The insert may include a first end (e.g., wire surface 122) configured to be flush with the cavity, a second end (e.g., top surface 120*a*), and at least two passages (e.g., wire passages 123).

The method 900 may also include, at block 920, inserting a fastener into each of the at least two passages in the insert. The fastener may be a bolt (e.g., bolts 124), a screw, a pin, or any similar elongated member with securing capabilities.

The method 900 may further include, at block 930, positioning a wire within the cavity via the opening in the first base wall. The wire (e.g., wire 140) may be any wire carrying an electric current. Prior to positioning the wire, at least a portion of the wire may be stripped (e.g., the insulation around the strands of the wire removed), and the stripped portion may be positioned within the cavity. By stripping the wire, the exposed strands may be able to be in direct contact with the internal contact within the cavity. In those embodiments in which the second base wall includes a recess (e.g., wire stop 104), the wire may be inserted until the wire abuts the recess.

The method 900 may also include, at block 940, turning the fastener in each of the at least two passages. The fastener may engage with the holes in the cavity, which may be threaded, such that turning the fastener causes the fastener to move or be drawn into the holes. This movement of the fastener causes the insert to, in turn, move towards the holes, which compresses the wire against the internal contact to electrify at least a portion of the clamping system.

The systems and methods herein provide numerous benefits over traditional wire clamps. For example, the horizontal length of the wedge-shaped insert 120 enables the system 10 to secure wires 140 of various gauges, particularly large-gauge wires that may present problems for single-bolt clamps. Additionally, as described herein, the shape of the insert 120 distributes the compressing force across a larger surface of the wire 140, in contrast to the single point of applied force from single-bolt clamps, which not only improves the strength of the clamp but also reduces the risk of damage to the wire and improves the consistency of the connection.

In some embodiments, a wire clamping system includes a base comprising a first base wall; a second base wall; and a cavity defined by the first base wall and the second base wall, the cavity having a lower portion. The system also includes an insert configured to fit within the cavity, the insert comprising a first end shaped to be substantially flush with the cavity; a second end opposite the first end; and at least two passages therethrough. The system further includes at least two bolts configured to be received by the second end of the insert and at least two holes positioned in the lower portion of the cavity. Securing the at least two bolts to the at least two holes causes the first end of the insert to move towards the lower portion the cavity.

In some of these embodiments, the first base wall comprises an opening shaped to receive a wire for placement therethrough into the cavity. In other of these embodiments, the second base wall comprises a recess shaped to receive the wire and impede further movement of the wire through the opening in the first base wall. In some of these embodiments, the first end is substantially wedge-shaped. In other of these embodiments, the first end comprises a parabolic side profile with a relative center of the first end being a farthest anterior extension of the first end.

In some of these embodiments, the at least two bolts each comprise a threaded portion; each of the at least two holes are threaded to match the threaded portion of the at least two bolts; and the at least two passages of the insert are unthreaded permitting rotation of the at least two bolts. In some of these embodiments, the at least two bolts each further comprise a cap, the threaded portion of at least one of the at least two bolts having a first diameter and the cap of at least one of the at least two bolts having a second diameter larger than the first diameter, at least one of the at least two passages comprises a first portion having a diameter substantially equal to the first diameter, a second portion having a diameter substantially equal to the second diameter, and a lip defined by a transition from the first portion to the second portion, and the cap abuts the lip as each of the at least one of the at least two bolts is received by each of the at least two passages. In some of these embodiments, the abutting cap applies a force to the lip as the at least two bolts are secured to the at least two holes, and the applied force causes the first end of the insert is caused to move towards the lower portion of cavity by the interface of the cap with the lip.

In some of these embodiments, the system further includes an external contact in electrical connection with a contact positioned in the cavity. In some of these embodiments, the external contact is configured to receive a fuse holder.

In some embodiments, a wire clamping system includes a cavity having a lower portion; and an insert having an end and two passages therethrough, the end shaped to fit within the cavity. Two holes and an internal contact may be positioned adjacent to the lower portion of the cavity. Each of the two passages is configured to receive a fastener, each of the two holes is configured to interface with the fastener, and turning the fastener causes the insert to move within the cavity.

In some of these embodiments, the insert end is substantially wedge-shaped. In other of these embodiments, the insert end comprises a parabolic side profile with a relative center of the first end being a farthest anterior extension of the first end.

In some of these embodiments, the fastener comprises a threaded portion; the two cavity holes are threaded to match the threaded portion; and the two passages of the insert are unthreaded permitting rotation of the fastener.

In some of these embodiments, the fastener further comprises a cap, the threaded portion having a first diameter and the cap having a second diameter larger than the first diameter, the two passages each comprise a first portion having a diameter substantially equal to the first diameter of the fastener, a second portion having a diameter substantially equal to the second diameter of the fastener, and a lip defined by a transition from the first portion to the second portion of the passages, and the cap abuts the lip as each of the fastener is received by each of the two passages. In some of these embodiments, the abutting cap applies a force to the lip as the fastener is turned, and the applied force causes the insert to move towards the lower portion of the cavity.

In some of these embodiments, the system further includes an external contact in electrical connection with the internal conductive contact. In some of these embodiments, the external contact is configured to receive a fuse holder.

In some embodiments, a method for clamping a wire includes providing a wire clamping system that includes a base comprising a first base wall having an opening; a second base wall; a cavity defined by the first base wall and the second base wall, the cavity having a lower portion; and at least two holes and an internal contact positioned adjacent to the lower portion of the cavity. The system further includes an insert configured to fit within the cavity, the insert comprising a first end shaped to be substantially flush with the lower portion of the cavity; a second end opposite the first end; and at least two passages therethrough. The method further includes inserting a fastener into each of the at least two passages via the second end for the fastener to engage with each of the at least two holes; positioning a wire within the cavity via the opening of the first base wall; and turning the fastener, the turning causing the first end of the insert to compress the wire against the internal contact.

In some of these embodiments, the wire clamping system further comprises an external contact in electrical connection with the internal contact, and the method further includes coupling a second wire to the external contact.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What is claimed is:

1. A wire clamping system comprising:
a base comprising:
a first base wall;
a second base wall; and
a concave cavity defined by the first base wall and the second base wall, the cavity having a lower portion;
an insert configured to fit within the cavity, the insert comprising:
a convex first end substantially flush with the cavity;
a second end opposite the first end; and
at least two passages therethrough; and
at least two bolts configured to be received by the second end of the insert and at least two holes positioned in the lower portion of the cavity,
wherein securing the at least two bolts to the at least two holes causes the first end of the insert to move towards the lower portion of the cavity.

2. The wire clamping system of claim 1, wherein the first base wall comprises an opening shaped to receive a wire for placement therethrough into the cavity.

3. The wire clamping system of claim 2, wherein the second base wall comprises a recess shaped to receive the wire and impede further movement of the wire through the opening in the first base wall.

4. The wire clamping system of claim 1, wherein the first end is substantially wedge-shaped.

5. The wire clamping system of claim 1, wherein the first end comprises a parabolic side profile with a relative center of the first end being a farthest anterior extension of the first end.

6. The wire clamping system of claim 1, wherein:
the at least two bolts each comprise a threaded portion;
each of the at least two holes are threaded to match the threaded portion of the at least two bolts; and
the at least two passages of the insert are unthreaded permitting rotation of the at least two bolts.

7. The wire clamping system of claim 6, wherein:
the at least two bolts each further comprise a cap, the threaded portion of at least one of the at least two bolts having a first diameter and the cap of at least one of the at least two bolts having a second diameter larger than the first diameter,
at least one of the at least two passages comprises a first portion having a diameter substantially equal to the first diameter, a second portion having a diameter substantially equal to the second diameter, and a lip defined by a transition from the first portion to the second portion, and
the cap abuts the lip as each of the at least one of the at least two bolts is received by each of the at least two passages.

8. The wire clamping system of claim 7, wherein:
the abutting cap applies a force to the lip as the at least two bolts are secured to the at least two holes, and
the applied force causes the first end of the insert to move towards the lower portion of the cavity by the interface of the cap with the lip.

9. The wire clamping system of claim 1, further comprising an external contact in electrical connection with a contact positioned at least one of adjacent or within the lower portion of the cavity.

10. The wire clamping system of claim 9, wherein the external contact is in electrical connection with a fuse holder.

11. A wire clamping system comprising:
a cavity having a lower portion; and
an insert having an end and two passages therethrough, the end shaped to fit within the cavity and substantially flush with the lower portion of the cavity,
wherein:
two holes and an internal conductive contact are positioned adjacent to the lower portion of the cavity;
each of the two passages is configured to receive a fastener,
each of the two holes is configured to interface with the fastener, and
turning the fastener causes the insert to move within the cavity.

12. The wire clamping system of claim 11, wherein the insert end is substantially wedge-shaped.

13. The wire clamping system of claim 11, wherein the insert end comprises a parabolic side profile with a relative center of the insert end being a farthest anterior extension of the insert end.

14. The wire clamping system of claim 11, wherein:
the fastener comprises a threaded portion;
the two holes are threaded to match the threaded portion; and
the two passages of the insert are unthreaded permitting rotation of the fastener.

15. The wire clamping system of claim 14, wherein:
the fastener further comprises a cap, the threaded portion having a first diameter and the cap having a second diameter larger than the first diameter,
the two passages each comprise a first portion having a diameter substantially equal to the first diameter of the fastener, a second portion having a diameter substantially equal to the second diameter of the fastener, and a lip defined by a transition from the first portion to the second portion of the passages, and
the cap abuts the lip as each of the fastener is received by each of the two passages.

16. The wire clamping system of claim 15, wherein:
the abutting cap applies a force to the lip as the fastener is turned, and
the applied force causes the insert to move towards the lower portion of the cavity.

17. The wire clamping system of claim 11, further comprising an external contact in electrical connection with the internal conductive contact.

18. The wire clamping system of claim 17, wherein the external contact is in electrical connection with a fuse holder.

19. A method for clamping a wire comprising:
providing a wire clamping system, the wire clamping system comprising:
a base comprising:
a first base wall having an opening;
a second base wall;
a concave cavity defined by the first base wall and the second base wall, the cavity having a lower portion; and
at least two holes and an internal contact positioned adjacent to the lower portion of the cavity; and
an insert configured to fit within the cavity, the insert comprising:
a convex first end shaped to be substantially flush with the lower portion of the cavity;
a second end opposite the first end; and
at least two passages therethrough;

inserting a fastener into each of the at least two passages via the second end for the fastener to engage with each of the at least two holes;

positioning a wire within the cavity via the opening of the first base wall; and turning the fastener, the turning causing the first end of the insert to compress the wire against the internal contact.

20. The method of claim 19, wherein the wire clamping system further comprises an external contact in electrical connection with the internal contact, the method further comprising:

coupling a second wire to the external contact.

* * * * *